United States Patent
Kennard

(10) Patent No.: US 9,998,200 B2
(45) Date of Patent: Jun. 12, 2018

(54) SYSTEMS AND METHODS FOR A FRONTHAUL NETWORK

(71) Applicant: Aviat U.S., Inc., Milpitas, CA (US)

(72) Inventor: Paul A. Kennard, San Jose, CA (US)

(73) Assignee: Aviat U.S., Inc., Milpitas, CA (US)

( * ) Notice: Subject to any disclaimer, the term of this patent is extended or adjusted under 35 U.S.C. 154(b) by 0 days. days.

(21) Appl. No.: 14/311,232

(22) Filed: Jun. 20, 2014

(65) Prior Publication Data

US 2014/0378047 A1  Dec. 25, 2014

Related U.S. Application Data

(60) Provisional application No. 61/837,493, filed on Jun. 20, 2013.

(51) Int. Cl.
*H04B 7/155* (2006.01)

(52) U.S. Cl.
CPC ................................ *H04B 7/15535* (2013.01)

(58) Field of Classification Search
CPC .... H04B 2001/0425; H04B 2001/0433; H03F 1/3247
USPC ........................................................ 455/114.3
See application file for complete search history.

(56) References Cited

U.S. PATENT DOCUMENTS

| | | | |
|---|---|---|---|
| 6,751,447 B1 * | 6/2004 | Jin ........................ | H03F 1/3252 330/136 |
| 2002/0136170 A1 * | 9/2002 | Struhsaker ............ | H01Q 1/246 370/280 |
| 2006/0067425 A1 * | 3/2006 | Windisch ............. | H04B 1/0475 375/296 |
| 2009/0170472 A1 * | 7/2009 | Chapin ................. | H04W 28/18 455/410 |
| 2009/0258652 A1 * | 10/2009 | Lambert ............... | H04W 88/04 455/446 |
| 2011/0032879 A1 * | 2/2011 | Beaudin ............. | H04B 7/15542 370/328 |
| 2012/0108188 A1 | 5/2012 | Matsumoto et al. | |
| 2012/0208477 A1 | 8/2012 | Nath et al. | |
| 2012/0270507 A1 | 10/2012 | Qin et al. | |
| 2013/0082775 A1 | 4/2013 | Matsumoto et al. | |
| 2013/0099862 A1 * | 4/2013 | Yu ........................ | H03F 1/3258 330/149 |

* cited by examiner

*Primary Examiner* — Yuwen Pan
*Assistant Examiner* — Fatuma Sherif
(74) *Attorney, Agent, or Firm* — Sheppard, Mullin, Richter & Hampton LLP

(57) ABSTRACT

Various embodiments provide for systems, methods, or apparatuses that provide a fronthaul architecture that facilitates high fidelity and low latency communication between a radio processing unit, such as a baseband unit (BBU), which may be located a central office (CO), and a remote transceiver, which may comprise a remote radio head (RRH) or a remote radio unit (RRU), which may be located at remote cell site.

12 Claims, 6 Drawing Sheets

SYSTEMS AND METHODS FOR A FRONTHAUL NETWORK

CROSS-REFERENCE TO RELATED APPLICATIONS

The present application claims the benefit of U.S. Provisional Patent Application Ser. No. 61/837,493, filed Jun. 20, 2013 and entitled "High Fidelity, Low Latency Front Haul Radio System," which is incorporated by reference herein.

BACKGROUND

1. Field of the Invention(s)

The present invention(s) relate to radio access networks and, more particularly, fronthaul networks used in radio access networks.

2. Description of Related Art

For scalability and rapid deployment purposes, communications carriers often implement their respective radio access networks (e.g., cellular networks, such as LTE and LTE-Advanced) using a split communications architecture, comprising a backhaul network and a fronthaul network. While the backhaul network generally provides data communication between a core network and sub-networks on the edge network (e.g., central office [CO]), the fronthaul network is meant to provide data communications between radio transceivers distributed at remote locations (e.g., remote radio heads [RRHs] on remote cell towers) and radio processing units (e.g., baseband units [BBUs] at a central office). Splitting radio transceivers from the radio processing units can not only permit pooling of digital resources with centralized radio processing (e.g., baseband processing), but also be cost effective, improve capacity, and improve performance in the resulting radio access network.

Often, the radio transceivers of the radio access network and their associated antennae are distributed a long distance (e.g. 1 to 10 km) from the radio process units, which are usually located at a central location. As such, to ensure transportation of radio frequency (RF) signals in real time, fronthaul networks traditionally rely on fiber optic connections that facilitate fast data rates and low latency. Each radio processing unit (e.g., BBU) is often connected to a radio transceiver (e.g., RRH) using a high speed interface protocol, called Common Public Radio Interface (CPRI), over a fiber optic connection.

Unfortunately, fiber optic connections are not as ubiquitously available as needed to implement a complete fiber optic-based fronthaul network for radio access networks. Additionally, implementing fiber optic connections is usually costly in time and money, especially with respect to radio transceivers of radio access networks, which are typically installed on building rooftops, towers, and the like.

SUMMARY OF EMBODIMENTS

Various embodiments described herein provide systems, methods, and apparatuses relating radio access networks and, more particularly, fronthaul networks used in radio access networks. Various embodiments provide for a fronthaul architecture that provides high fidelity and low latency communication between a radio processing unit, such as a baseband unit (BBU), which may be located a central office (CO), and a remote transceiver, which may comprise a remote radio head (RRH) or a remote radio unit (RRU), which may be located at remote cell site.

According to some embodiments, a system, method, or apparatus is provided, where the system, method, or apparatus receives data and converts the data to a first radio frequency signal having a first frequency. The data may comprise data formatted according to the Common Public Radio Interface (CPRI) standard (hereafter, "CPRI data"), the data may be received by way of a fiber optic connection, and the first frequency may be one relating to cellular communications (e.g., LTE, LTE-Advanced, 3G, 4G, HSDPA, etc.). The system, method, or apparatus may pre-distort a first intermediate signal to produce a pre-distorted radio frequency signal, where the first intermediate signal is based on the first radio frequency signal. The system, method, or apparatus may upconvert a second intermediate signal to a second radio frequency signal having a second frequency, where the second intermediate signal is based on the pre-distorted radio frequency signal and where the second frequency comprises an operating frequency of a radio transmitter operating at a remote location (e.g., site having a cell tower). The radio transmitter may be a radio transceiver, the radio transmitter may comprise a remote radio head (RRH), the data may be received from a radio processing unit, such as a baseband unit (BBU) (e.g., at a central office), and the second frequency may comprise a microwave or millimeter wave frequency. The system, method, or apparatus may amplify a third intermediate signal to an amplified radio frequency signal having the second frequency, where the third signal is based on the second radio frequency signal. The system, method, or apparatus may transmit a fourth intermediate signal to the remote location, where the fourth intermediate signal is based on the amplified radio frequency signal. For some embodiments, the pre-distorting is based on a feedback signal that is based on the amplified radio frequency signal.

According to some embodiments, a system, method, or apparatus is provided, where the system, method, or apparatus receives a first radio frequency signal, having a first frequency at a remote location. The first frequency may comprise a microwave or millimeter wave frequency. The system, method, or apparatus may amplify a first intermediate signal to a first amplified radio frequency signal, where the first intermediate signal is based on the first radio frequency signal. The system, method, or apparatus may downconvert a second intermediate signal to a second radio frequency signal having a second frequency, where the second intermediate signal is based on the first amplified radio frequency signal and where the second frequency comprises an operating frequency of a radio transmitter operating at the remote location (e.g., cell site). The second frequency may be one relating to cellular communications. The system, method, or apparatus may pre-distort a third intermediate signal to produce a pre-distorted radio frequency signal having the second frequency, where the third intermediate signal is based on the second radio frequency signal. The system, method, or apparatus may amplify a fourth intermediate signal to a second amplified radio frequency signal having the second frequency, where the fourth intermediate signal is based on the pre-distorted radio frequency signal. The system, method, or apparatus may transmit a fifth intermediate signal by the radio transmitter, where the fifth intermediate signal is based on the second amplified radio frequency signal.

According to some embodiments, a system, method, or apparatus is provided, where the system, method, or apparatus receives a first radio frequency signal from a radio receiver and amplifies a first intermediate signal to a first amplified radio frequency signal, where the first intermediate signal is based on the first radio frequency signal. The radio receiver may be a radio transceiver, the radio transmitter may comprise a remote radio head (RRH), and the first frequency may be one relating to cellular communications (e.g., LTE, LTE-Advanced, 3G, HSDPA, etc.). The system, method, or apparatus may pre-distort a second intermediate signal to produce a pre-distorted radio frequency signal, where the second intermediate signal is based on the first amplified radio frequency signal. The system, method, or apparatus may upconvert a third intermediate signal to a second radio frequency signal having a second frequency, where the third intermediate signal is based on the pre-distorted radio frequency signal. The second frequency may comprise a microwave or millimeter wave frequency. The system, method, or apparatus may a fourth intermediate signal to a second amplified radio frequency signal having the second frequency, where the fourth intermediate signal is based on second radio frequency signal. The system, method, or apparatus may transmit a fifth intermediate signal to a remote location (e.g., central office having a BBU), where the fifth intermediate signal is based on the second amplified radio frequency signal.

According to some embodiments, a system, method, or apparatus is provided, where the system, method, or apparatus receives a first radio frequency signal from a remote location (e.g., site having a cell tower) and amplifies a first intermediate signal to a first amplified radio frequency signal, where the first intermediate signal is based on the first radio frequency signal. The first frequency may comprise a microwave or millimeter wave frequency. The system, method, or apparatus may downconvert a second intermediate signal to a second radio frequency signal having a second frequency, where the second intermediate signal is based on the first amplified radio frequency signal and where the second frequency comprises an operating frequency of a radio receiver operating at the remote location. The system, method, or apparatus may convert a third intermediate signal to data, where the third intermediate signal is based on the second radio frequency signal. The resulting data may be provided (e.g., transmitted) to a radio processing unit, such as baseband unit (BBU) operating at a central office. The data may comprise Common Public Radio Interface (CPRI) data, which may be received by the radio process unit by way of a fiber optic connection.

For some embodiments, radio transmission and reception components between fronthaul modules are facilitated using a split-mount wireless communication system, which may include an outdoor unit (ODU) coupled to an antenna, and an indoor unit (IDU) coupled to the ODU.

Various embodiments described herein are implemented in association with a device that operates as a transmitting device, receiving device, or both. Additionally, in some embodiments described herein, a computer system, or a computer program product, comprises a computer readable medium having computer program code (i.e., executable instructions) executable by a processor to perform various steps and operations described herein.

BRIEF DESCRIPTION OF THE DRAWINGS

The drawings are provided for purposes of illustration only and merely depict typical or example embodiments. These drawings are provided to facilitate the reader's understanding and shall not be considered limiting of the breadth, scope, or applicability various embodiments.

Figure 1:
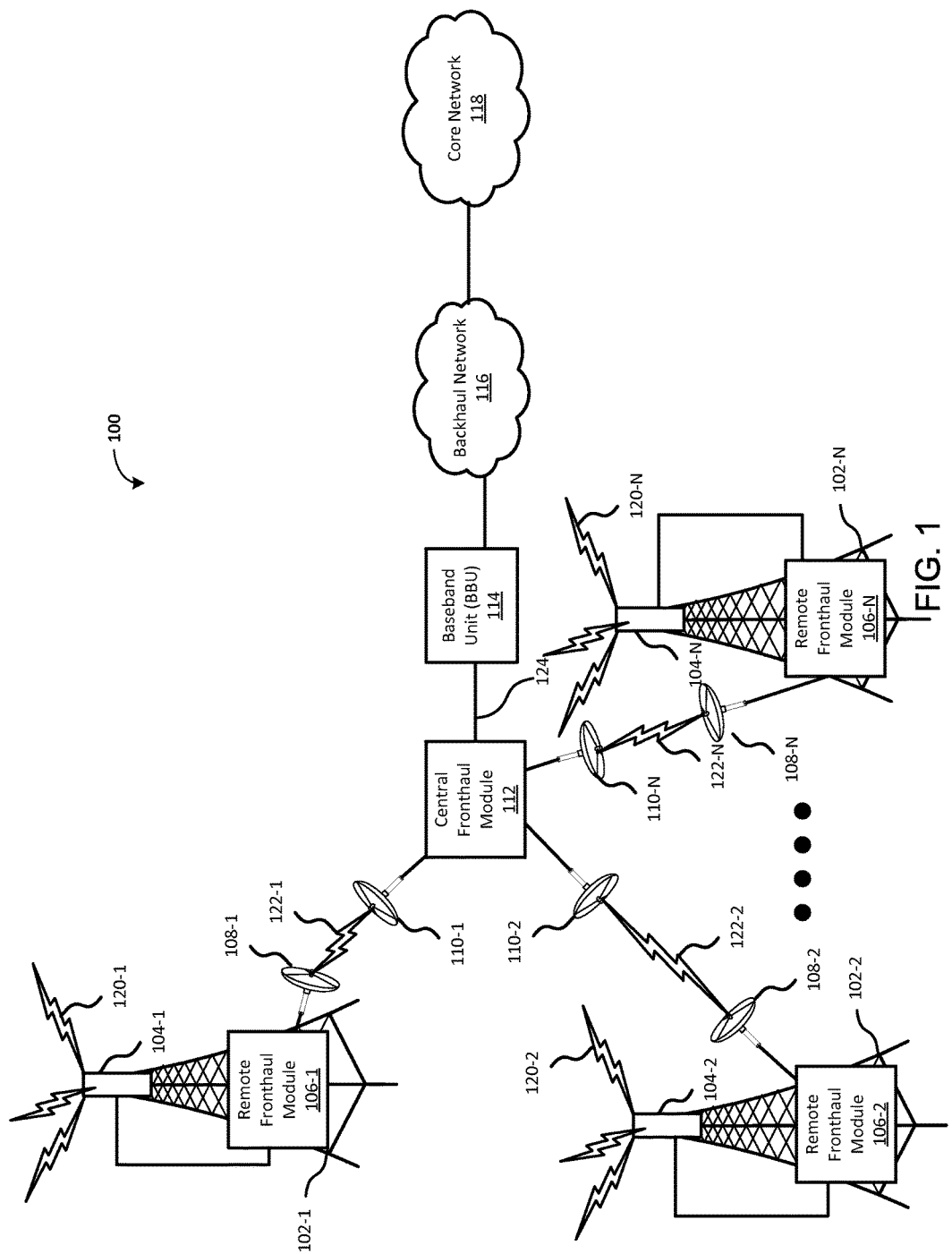
FIG. 1 depicts an example environment including a fronthaul system in a communications network in accordance with some embodiments.

The figures are not intended to be exhaustive or to limit the embodiments to the precise form disclosed. It should be understood that various embodiments may be practiced with modification and alteration.

DETAILED DESCRIPTION OF VARIOUS EMBODIMENTS

Various embodiments provide for systems, methods, or apparatuses that facilitate high fidelity and low latency fronthaul network architecture for use in radio communications, especially with respect to omni-directional base stations. For example, systems, methods, or apparatuses may provide a fronthaul architecture that provides high fidelity and low latency communication between a radio processing unit, such as a baseband unit (BBU), which may be located a central office (CO), and a remote transceiver, which may comprise a remote radio head (RRH) or a remote radio unit (RRU), which may be located at remote cell site.

Some embodiments are capable of receiving data through a Common Public Radio Interface (CPRI) interface (e.g., data from a baseband unit [BBU] at a central office) and effectively that extends the CPRI interface to a remote location (e.g., cell tower at a cell site) using radio communications, such as microwave radio. For some embodiments, use of microwave radio facilitates extension of a CPRI interface, or the like, while maintaining the fidelity and low latency requirements of a CPRI interface. For example, the use of microwave radio in extending CPRI interfaces (and the like) permit various embodiments to transport data between the edge of a backhaul network and one or more remote radio transceivers with minimal or no degradation in the data and with low latency. In some embodiments, maintaining the fidelity and low latency requirements of the CPRI interface is crucial, as the fidelity and low latency characteristics of CPRI specification enable proper operation of fronthaul networks used in the implementation of cellular networks and other radio access networks (e.g., WiMAX).

For some embodiments, when a CPRI interface is extended in a manner described herein, microwave radio signals or the like utilized carry CPRI data between fronthaul modules (e.g., between a remote fronthaul module and a central fronthaul module). Those skilled in the art will appreciate that in some embodiments, a fronthaul system is provided comprising one or more fronthaul modules coupled to radio process units (e.g., at the edge of a backhaul network) and one or more fronthaul modules coupled to a radio receiver, transmitter, or transceiver (e.g., at a location remote from the edge of the backhaul network). The use of some embodiments obviates the need to take the CPRI-based digital information, which has a high data rate (e.g., above 6 Gbs), and converting it to a high-level QAM signal with very high symbol rate and bandwidth. Additionally, the use of some embodiments allows an analog signal in the frequency domain to be transmitted to a remote location where it can be integrated with a small cell base station that functions as an extension of a macro base station. Further, the use of some embodiments minimizes the bandwidth requirements of the CPRI interface.

In some embodiments, the systems, methods, or apparatuses facilitate fronthaul extension of a macro base station radio frequency (RF) signal with high fidelity and minor increase of error vector magnitude (EVM). Further, some embodiments provide a low cost integration of fronthaul radios at microwave (e.g., 23 or 24 GHz) and millimeter wave frequencies with a small base station at frequencies of 700-2400 MHz. Additionally, some embodiments utilize analog pre-distortion to linearize a signal in a transmission chain radio transmission (e.g., between components of the fronthaul system, or between a radio transceiver and a mobile device). Some embodiments also use very low digital signal processing in the radio, thereby reducing cost, DC power usage, and latency. In some embodiments, the systems, methods or, apparatuses have very low power requirements, thereby make them energy efficient and "Green."

Though various embodiments illustrated and described herein relate to receiving, processing, and transmitting radio signals in one direction, those skilled in the art will appreciate that for some embodiments, the components and operations described herein can easily be modified to receive, process, and transmit radio signals in the opposite direction or in both directions. Further, those skilled in the art will appreciate that the various embodiments illustrated and described herein are merely provided for illustrative purposes and that some embodiments illustrated and described herein exclude components or operations (e.g., diplex filters and the like) that may be otherwise present in other embodiments.

FIG. 1 depicts an example environment 100 including a fronthaul system in a communications network in accordance with some embodiments. In FIG. 1, the environment 100 comprises radio access network tower 102-1 through 102-N (hereafter, collectively referred to as the radio access network towers 102), radio transceivers 104-1 through 104-N (hereafter, collectively referred to as the radio transceivers 104) physically located at their respective radio access network towers 102, the remote fronthaul modules 106-1 through 106-N (hereafter, collectively referred to as the remote fronthaul modules 106) physically located at their respective radio access network towers 102, remote antennae 108-1 through 108-N (hereafter, collectively referred to as the remote antennae 108) physically located at their respective radio access network towers 102, central antennae 110-1 through 110-N, a central fronthaul module 112 coupled to and physically located at or near the remote antennae 108, a baseband unit (BBU) 114, a backhaul network 116, and a core network 118. As shown in FIG. 1, the radio transceivers 104 are coupled to the remote fronthaul modules 106 at their respective radio access network towers 102 and, likewise, the remote antennae 108 are coupled to the remote fronthaul modules 106 at their respective radio access network towers 102. As shown in FIG. 1, the central fronthaul module 112 is coupled to the baseband unit 114, the baseband unit 114 is coupled to the backhaul network 116, and the backhaul network 116 is coupled to the core network 118. Those skilled in the art will appreciate that for some embodiments, the components, functionality, or configuration of either the remote fronthaul modules 106, the central fronthaul module 112, or the other components of the environment 100 may differ from what is described or depicted with respect to FIG. 1.

As used herein, the term module might describe a given unit of functionality that can be performed in accordance with one or more embodiments. As used herein, a module might be implemented utilizing any form of hardware, software, or a combination thereof. For example, one or more processors, controllers, ASICs, PLAs, PALs, CPLDs, DPLLs, FPGAs, logical components, software routines or other mechanisms might be implemented to make up a module. In implementation, the various modules described herein might be implemented as discrete modules or the functions and features described can be shared in part or in total among one or more modules. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Depending on the embodiment, the central fronthaul module 112 may be physically located at or near the baseband unit 114, which in turn may be physically located at, and coupled to, the edge of the backhaul network 116. The remote towers 102 may be physically located at a site remote from the central fronthaul module 112. Based on the physical split and distance between the radio transceivers 104 and the baseband unit 114, for some embodiments, each of the radio access network towers 102 utilizes their respective remote fronthaul module (e.g., the radio access network towers 102-1 utilized the remote fronthaul module 106-1) and their respective remote antenna (e.g., the radio access network towers 102-1 utilized the remote antenna 108-1) to establish a radio-based connection with one of the central antennae 110 coupled to the central fronthaul module 112. For some embodiments, the central fronthaul module 112 is coupled to the baseband unit 114 by way of an interconnection 124 using a standard interface specification, which may facilitate low latency, high fidelity, or high bandwidth data communication. As described herein, Common Public Radio Interface (CPRI) may be one interface specification utilized to interconnect the central fronthaul module 112 and the baseband unit 114. The interconnection 124 between the central fronthaul module 112 and the baseband unit 114 may be a fiber optic connection.

Depending on the embodiment, the core network 118 may represent one or more components of a physical network infrastructure through which network service providers, carriers, and Internet service providers (e.g., tier 1 carriers, such as AT&T, Level 3 Communications, Verizon, CenturyLink, Sprint, and the like) exchange network traffic between their respective networks. Additionally, the backhaul network 116 may represent one or more components of a network provides intermediate links between the core network 118 and one or more small sub-network at the edge of an hierarchical network, and thus the edge of the backhaul network 116. As described herein, the edge of the backhaul network 116 can include a central office (CO) or the like, where the baseband unit 114 may be coupled to the backhaul network 116 and physically located. For some embodiments, the baseband unit 114 comprises a stack of two or more baseband units, where each baseband unit may be dedicated to handling communication for only one of the radio transceivers 104. In some embodiments, the baseband unit 114 comprises a single baseband unit and one or more load balancing components that enable the single baseband unit to be utilized with more than one of the radio transceivers 104. Depending on the embodiment, each of one or more of the radio transceivers 104 comprises a remote radio head (RRH) or remote radio unit (RRU).

For some embodiments, the central fronthaul module 112 receives data from the backhaul network 116 by way of the baseband unit 114 and, in turn, the central fronthaul module 112 converts the data to a radio frequency signal. For some embodiments, the resulting radio frequency signal is a microwave or millimeter wave radio signal. Depending on the embodiment, the central fronthaul module 112 may eventually transmit the radio frequency signal to one or more of the remote fronthaul modules 106. The remote fronthaul modules 106 that receive the radio frequency signal may respectively convert the received radio frequency signal to a radio frequency signal having a frequency similar to equal to an operating frequency utilized by their respective radio transceiver. For example, the remote fronthaul module 106-2 may receive a first radio frequency signal from the central fronthaul module 112 via the central antenna 110-2 and the remote antenna 108-2, the remote fronthaul module 106-2 may convert the first radio frequency signal from a first frequency (e.g., microwave frequency) to a second radio frequency signal having a second frequency (e.g., LTE frequency, such as 700 MHz), and the remote fronthaul module 106-2 may provide the radio transceiver 104-2 the second radio frequency signal for transmission 120-2 (e.g., to a LTE-based mobile device). As noted herein, for some embodiments, similar processes may be performed when the radio transceiver 104-2 receives a third frequency signal (e.g., form a LTE-based mobile device) and provided to the remote fronthaul module 106-2 for transmission back to the baseband unit 114 by way of the central fronthaul module 112.

Depending on the embodiments, one or more of the central fronthaul module 112 and the remote fronthaul modules 106 may implement feedback-based analog pre-distortion processing to radio frequency signals before they are transmitted by way of an antenna. For some embodiments, the pre-distortion processing is implemented in one or more fronthaul in accordance with the techniques provided in one or more of U.S. Patent Application Publication No. 2013/0082775, entitled "SYSTEMS AND METHODS FOR ADAPTIVE POWER AMPLIFIER LINEARIZATION," U.S. Patent Application Publication No. 2012/0108188, entitled "SYSTEMS AND METHODS FOR IMPROVED POWER YIELD AND LINEARIZATION IN RADIO FREQUENCY TRANSMITTERS," U.S. Patent Application Publication No. 2012/0208477, entitled "SYSTEMS AND METHODS FOR A RADIO FREQUENCY TRANSMITTER WITH IMPROVED LINEARITY AND POWER OUT UTILIZING PRE-DISTORTION AND A GAN (GALLIUM NITRIDE) POWER AMPLIFIER DEVICE," and U.S. Patent Application Publication No. 2012/0270507, entitled "SYSTEMS AND METHODS OR REDUCTION OF TRIPLE TRANSIT EFFECTS IN TRANSCEIVER COMMUNICATIONS," each of which is incorporate herein by reference.

Figure 2:
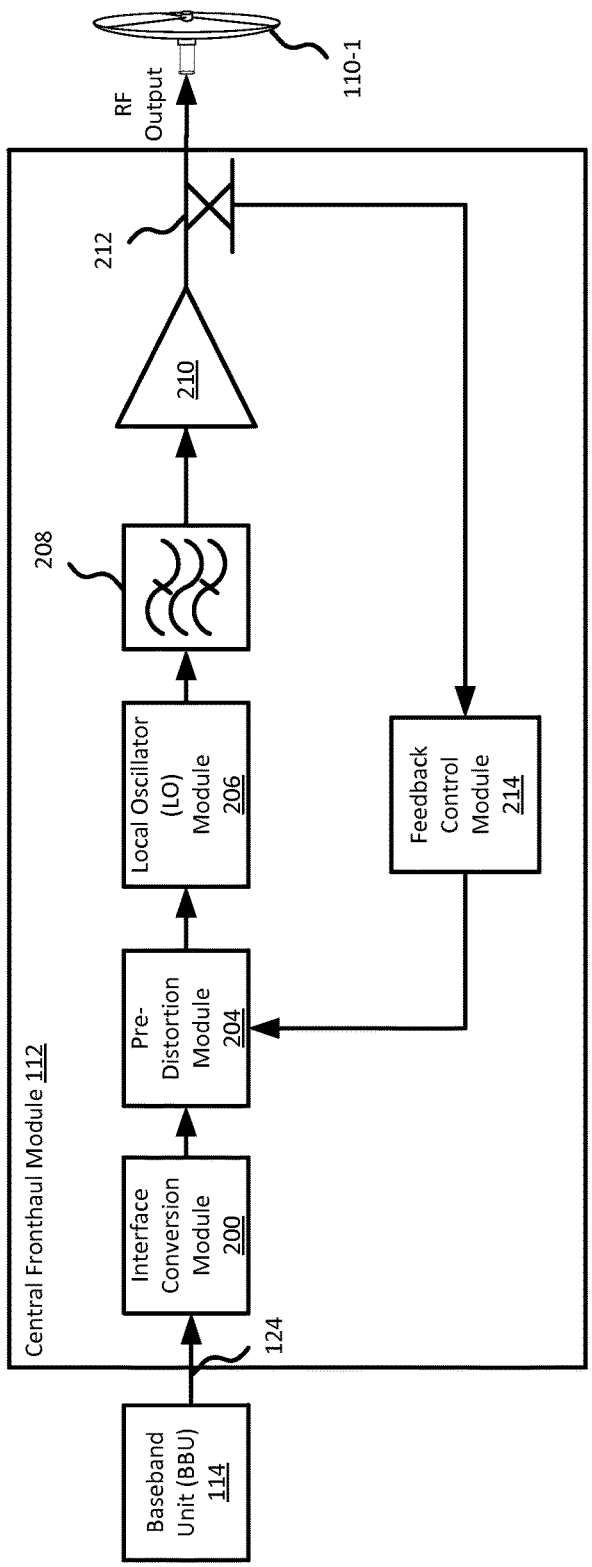
FIG. 2 depicts an example central fronthaul module in accordance with some embodiments.

FIG. 2 depicts an example central fronthaul module 112 in accordance with some embodiments. In FIG. 2, the central fronthaul module 112 comprises an interface conversion module 200, a pre-distortion module 204, a local oscillator (LO) module 206, a filter 208, a power amplifier 210, a directional coupler 212, and a feedback control module 214. As shown in FIG. 2, the interface conversion module 200 may be coupled to the baseband unit 114, the pre-distortion module 204 may be coupled to the interface conversion module 200, the local oscillator module 206 may be coupled to the pre-distortion module 204, the filter 208 may be coupled to the local oscillator module 206, the power amplifier 210 may be coupled to the filter 208, the directional coupler 212 may be coupled to the output of the power amplifier 210, the output of the power amplifier 210 may be coupled to the central antenna 110-1, and the feedback control module 214 may be coupled to the directional coupler 212 and the pre-distortion module 204. Those skilled in the art will appreciate that for some embodiments the components, functionality, or configuration of the central fronthaul module 112 may differ from what is described or depicted with respect to FIG. 2.

According to some embodiments, the interface conversion module 200 is configured to receive data (e.g., data from the backhaul network 118) from the baseband unit 114. The baseband unit 114 may be one configured for cellular communications using such technologies as 3G, 4G, HSDPA, LTE, LTE-Advanced, and the like. As described herein, the interface conversion module 200 and the baseband unit 114 may be coupled by way of the interconnection 124, which may comprise of a fiber optic connection implementing a Common Public Radio Interface (CPRI). Depending on the embodiment, the interconnection 124 may have speeds up to 12 Gbs. For some embodiments, the interface conversion module 200 is further configured to convert the data received from the baseband unit 114 to the radio frequency domain. Depending on the embodiment, the interface conversion module 200 may receive the CPRI data from the baseband unit 114 and convert the received data to a first radio frequency signal having a first frequency. The first frequency may be determined based on the operating frequency of the radio transmitter or transceiver (e.g., the radio transceiver 104-1) that is intended to receive the data from the baseband unit 112. For instance, where the radio transceiver 104-1 is intended to receive the data the interface conversion module 200 received from the baseband unit 112, and where the radio transceiver 104-1 is operating at 700 MHz (e.g., LTE signal), the first frequency of the first radio frequency signal generated by the interface conversion module 200 may be 700 MHz. Likewise, where the radio transceiver 104-1 is operating at 800 MHz (e.g., HSDPA signal) the first frequency can be 800 MHz, and where the radio transceiver 104-1 is operating at 900 MHz the first frequency can be 900 MHz. For various embodiments, the first radio frequency signal generated by the interface conversion module 200 is a cellular signal (e.g., LTE signal) suitable for transmission at a radio transceiver (e.g., RRH) at a cellular tower.

The pre-distortion module 204 may be configured to receive the first radio frequency from the interface conversion module 200, add pre-distortion to the first radio frequency, and provide a pre-distorted radio frequency signal. For some embodiments, the pre-distortion module 204 adds pre-distortion to the first radio frequency based on a control signal provided by the feedback control module 214. Depending on the embodiments, the feedback control module 214 may be configured to generate the control signal based on a feedback signal, which in turn may be based on a sample of the radio frequency signal provided by the directional coupler 212 from the signal outputted by the power amplifier 210. As described herein, the components and operation of the pre-distortion 204, the feedback control module 214, and possibly other related components may operate or be configured in accordance with techniques provided in one or more of U.S. Patent Application Publication No. 2013/0082775, entitled "SYSTEMS AND METHODS FOR ADAPTIVE POWER AMPLIFIER LINEARIZATION," U.S. Patent Application Publication No. 2012/0108188, entitled "SYSTEMS AND METHODS FOR IMPROVED POWER YIELD AND LINEARIZATION IN RADIO FREQUENCY TRANSMITTERS," U.S. Patent Application Publication No. 2012/0208477, entitled "SYSTEMS AND METHODS FOR A RADIO FREQUENCY TRANSMITTER WITH IMPROVED LINEARITY AND POWER OUT UTILIZING PRE-DISTORTION AND A GAN (GALLIUM NITRIDE) POWER AMPLIFIER DEVICE," and U.S. Patent Application Publication No. 2012/0270507, entitled "SYSTEMS AND METHODS OR REDUCTION OF TRIPLE TRANSIT EFFECTS IN TRANSCEIVER COMMUNICATIONS," each of which is incorporate herein by reference. Through techniques provided by one or more of the foregoing U.S. patent application Publications, the pre-distortion module 204 and the feedback control module 214 can control (e.g., reduce) intermodulation distortion affecting bit error rate (BER) and/or intermodulation distortion affecting spectrum mask, thereby affecting (e.g., improving) performance of embodiment.

By adding the pre-distortion to the first radio frequency in this way, the pre-distortion module 204 may linearize the radio frequency signal that is eventually outputted by the power amplifier 210, and possibly negate the non-linearizing effects of the power amplifier 210. Through the linearization, the central fronthaul module 112 can ensure that the radio frequency signal eventually outputted by the power amplifier 210 and transmitted to a remote fronthaul module (e.g., the remote fronthaul module 106-1) and its coupled radio transceiver (e.g., the radio transceiver 104-1) has high fidelity. Further, through use of minimization of digital circuits in the central fronthaul module 112 and the corresponding remote fronthaul module (e.g., the remote fronthaul module 106-1), various embodiments can process and transport data with low latency (e.g., less than 1 ms).

The local oscillator module 206 may be configured to receive the signal provided by the pre-distortion module 204 and upconvert the signal to a second radio frequency signal having a second frequency. Depending on the embodiment, the local oscillator module 206 may include a local oscillator and a mixer that facilitate upconversion of the signal received from the pre-distortion module 204. For some embodiments, the second radio frequency signal is a microwave or millimeter wave radio signal that can eventually be transmitted to a remote fronthaul module (e.g., the remote fronthaul module 106-1) at a remote location having a radio transceiver (e.g., the radio transceiver 104-1). To control (e.g., reduce) phase noise in the transmission chain of the central fronthaul module 112, the local oscillator module 206 may utilize a low phase noise coaxial resonator oscillator (CRO) that generates a 23 GHz or 24 GHz signal. As a result, for some embodiments, the second radio frequency generated by the local oscillator module 206 may have a frequency of 23 GHz or 24 GHz. For some embodiments, the generation of a second radio frequency signal at 23 GHz or 24 GHz can control fading caused by rain and, possibly, other weather that can cause signal degradation.

The filter 208 may be configured to filter (e.g., channel filter) the second radio frequency signal before the power amplifier 210 amplifies the second radio frequency signal to an amplified radio frequency signal. As described herein, before the amplified radio frequency signal is outputted to the central antenna 110-1 for transmission, the directional coupler 212 may obtain a sample of the amplified radio frequency signal and provide the sample to the feedback control module 214 for purposes of controlling (e.g., adjusting) the pre-distortion added by the pre-distortion module 204 to the signal earlier in the transmission chain. For some embodiments, the power amplifier 210 is configured to provide gain that is sufficient for addressing signal performance impairments due to thermal fading.

Figure 3:
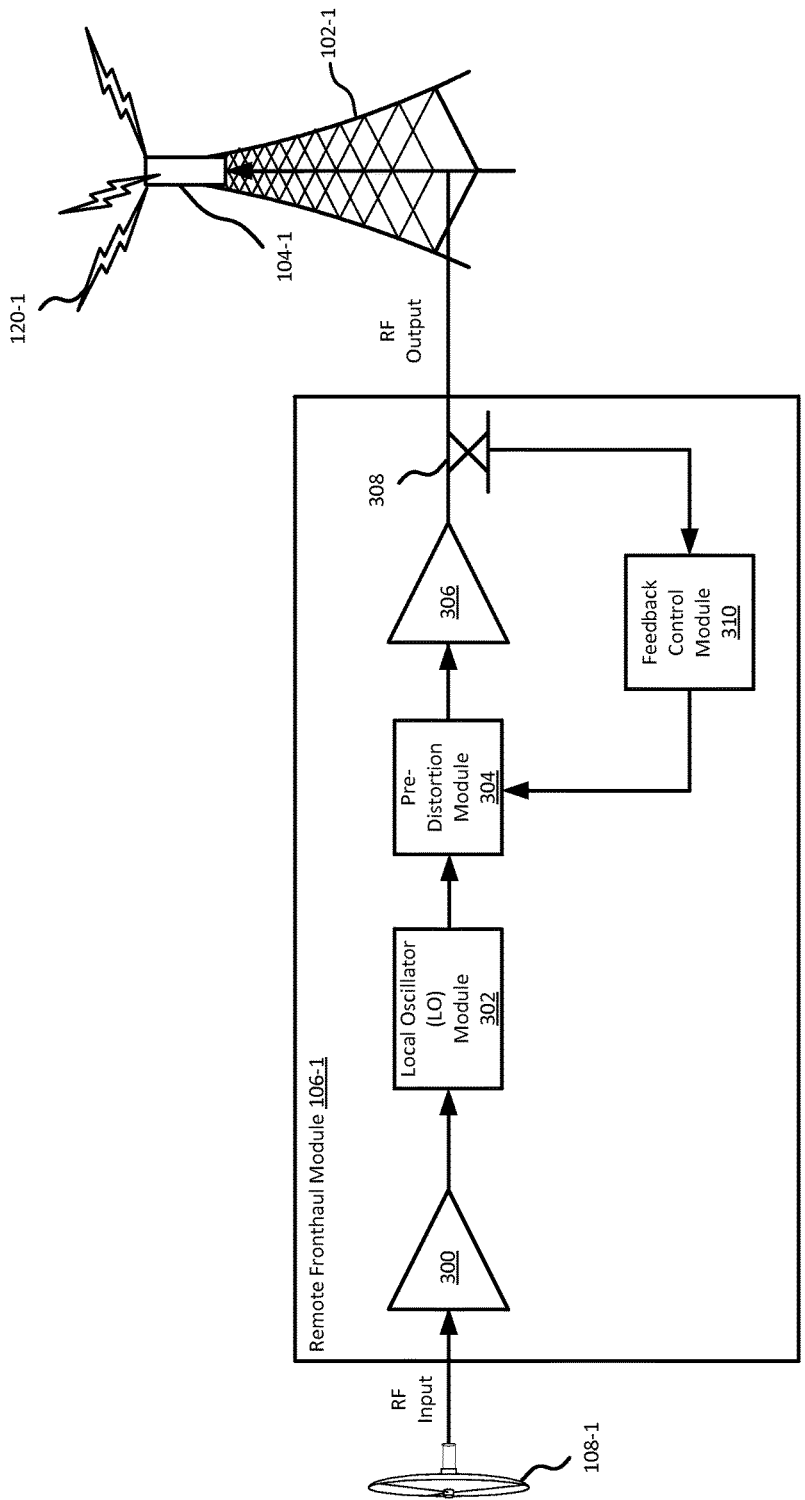
FIG. 3 depicts an example remote fronthaul module in accordance with some embodiments.

FIG. 3 depicts an example remote fronthaul module 106-1 in accordance with some embodiments. In FIG. 3, the remote fronthaul module 106-1 comprises a first power amplifier 300, a local oscillator (LO) module 302, a pre-distortion module 304, a second power amplifier module 306, and a directional coupler 308. As shown in FIG. 3, the first power amplifier 300 may be coupled to the remote antenna 108-1, the local oscillator module 302 may be coupled to the first power amplifier 300, the pre-distortion module 304 may be coupled to the local oscillator module 302, the second power amplifier 306 may be coupled to the pre-distortion module 304, the directional coupler 308 may be coupled to the output of the second power amplifier 306, the output of the second power amplifier 306 may be coupled to the radio transceiver 104-1, and the feedback control module 310 may be coupled to the directional coupler 308 and the pre-distortion module 304. Those skilled in the art will appreciate that for some embodiments the components, functionality, or configuration of the remote fronthaul module 106-1 may differ from what is described or depicted with respect to FIG. 3.

The power amplifier 300 may be configured to receive a first radio frequency signal from the remote antenna 108-1 and amplify the first radio frequency signal to produce a first amplified radio frequency signal. As described herein, the first radio frequency signal may be one received by the remote antenna 108-1 from a central fronthaul module (e.g., the central fronthaul module 112), and the first radio frequency signal may be a microwave or millimeter wave signal. For some embodiments, the power amplifier 300 is a low-noise amplifier.

The local oscillator module 302 may be configured to receive the first amplified radio frequency signal from the power amplifier 300 and downconvert the signal to a second radio frequency signal having a second frequency. For some embodiments, the second frequency of the second radio frequency signal is similar or equal to the operating frequency (e.g., target frequency) of the radio transceiver 104-1, which will eventually transmit the signal it receives from the remote fronthaul module 106-1. For instance, where the radio transceiver 104-1 is operating at a frequency of 700 MHz (e.g., LTE signal), the second radio frequency would be at 700 MHz. Further, for some embodiments, the second frequency of the second radio frequency signal is similar or equal to the frequency of the radio frequency signal a central fronthaul module (e.g., the central fronthaul module 112) generated when converting data from a baseband unit (e.g., the baseband unit 114) to the radio frequency signal.

The pre-distortion module 304 may be configured to receive the second radio frequency from the local oscillator module 302, add pre-distortion to the second radio frequency, and provide a pre-distorted radio frequency signal. For some embodiments, the pre-distortion module 304 adds pre-distortion to the second radio frequency based on a control signal provided by the feedback control module 310. Depending on the embodiments, the feedback control module 310 may be configured to generate the control signal based on a feedback signal, which in turn may be based on a sample of the radio frequency signal provided by the directional coupler 308 from the signal outputted by the power amplifier 306. As described herein, the components and operation of the pre-distortion 304, the feedback control module 310, and possibly other related components may operate or be configured in accordance with techniques provided in one or more of U.S. Patent Application Publication No. 2013/0082775, entitled "SYSTEMS AND METHODS FOR ADAPTIVE POWER AMPLIFIER LINEARIZATION," U.S. Patent Application Publication No. 2012/0108188, entitled "SYSTEMS AND METHODS FOR IMPROVED POWER YIELD AND LINEARIZATION IN RADIO FREQUENCY TRANSMITTERS," U.S. Patent Application Publication No. 2012/0208477, entitled "SYSTEMS AND METHODS FOR A RADIO FREQUENCY TRANSMITTER WITH IMPROVED LINEARITY AND POWER OUT UTILIZING PRE-DISTORTION AND A GAN (GALLIUM NITRIDE) POWER AMPLIFIER DEVICE," and U.S. Patent Application Publication No. 2012/0270507, entitled "SYSTEMS AND METHODS OR REDUCTION OF TRIPLE TRANSIT EFFECTS IN TRANSCEIVER COMMUNICATIONS," each of which is incorporate herein by reference. Through techniques provided by one or more of the foregoing U.S. patent application Publications, the pre-distortion module 304 and the feedback control module 310 can control (e.g., reduce) intermodulation distortion affecting bit error rate (BER) and/or intermodulation distortion affecting spectrum mask, thereby affecting (e.g., improving) performance of embodiment.

The second power amplifier 306 may be configured to amplify the pre-distorted radio frequency signal to a second amplified radio frequency signal. As described herein, before the amplified radio frequency signal is outputted to the radio transceiver 104-1 for transmission, the directional coupler 308 may obtain a sample of the amplified radio frequency signal and provide the sample to the feedback control module 310 for purposes of controlling (e.g., adjusting) the pre-distortion added by the pre-distortion module 204 to the signal earlier in the transmission chain.

Figure 4:
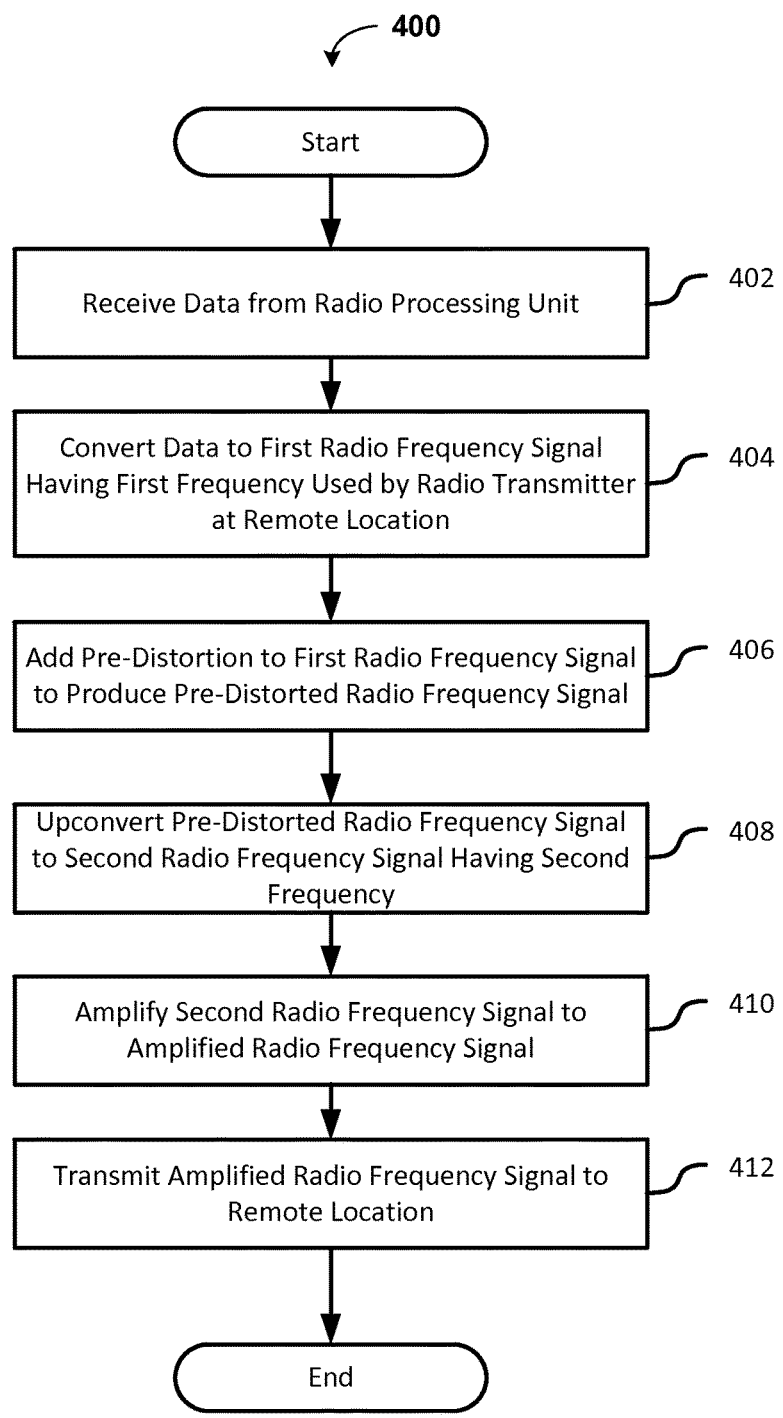
FIG. 4 is a flow diagram of an example method for a fronthaul system in accordance with some embodiments.

FIG. 4 is a flow diagram of an example method 400 for a fronthaul system in accordance with some embodiments. According to some embodiments, the method 400 is performed by a fronthaul module, such as the central fronthaul module 112, coupled to a radio processing unit (e.g., BBU) and configured to transport data from the radio processing unit to another fronthaul module, such as the remote fronthaul module 106-1, coupled to a radio transmitter, such as a radio transceiver, a remote radio head (RRH), or the like. As described herein, the central fronthaul module 112 may be implemented at the edge of a backhaul network, such as a central office (CO), while the remote fronthaul 106-1 may be implemented at a remote location where the radio transmitter is be implemented, such as a cell site. As also described herein, by performing the method 400, the central fronthaul module 112 may facilitate the extension of an interface, such as a CPRI interface, from a radio processing unit to a radio transmitter remote (e.g., 1-10 km away) from the radio processing unit.

As shown in FIG. 4, the method 400 may begin at step 402, with the interface conversion module 200 receiving data. The data may comprise data defined according an interface specification, such as Common Public Radio Interface or the like, which may facilitate data communication between a base stations and a remote radio unit. The data may be received from a radio processing unit, such as a baseband unit or the like. Additionally, the data may be received by way of a fiber optic connection from the baseband unit to the interface conversion module 200.

At step 404, the interface conversion module 200 may convert the data received at step 402 to a first radio frequency signal having a first frequency similar or equal to frequency used by a radio transmitter (e.g., RRH) implemented at a remote location. At step 406, the pre-distortion module 304 add pre-distortion to the first radio frequency signal generated at step 404 to produce a pre-distorted radio frequency signal. As described herein, the pre-distortion module 204 may add pre-distortion to the first radio frequency signal based on the radio frequency signal eventually produced by the power amplifier 210 and sampled by the directional coupler 212.

At step 408, the local oscillator module 206 may upconvert the pre-distorted radio frequency signal produced at step 404 to produce a second radio frequency signal. As described herein, the second radio frequency signal may be a microwave or millimeter wave signal that will ultimately be transmitted from a central fronthaul module to a remote fronthaul module.

At step 410, the power amplifier 210 may amplify the second radio frequency signal generated at step 408 to produce an amplified radio frequency signal that can be transmitted to a remote fronthaul module. Eventually, at step 412, the amplified radio frequency signal generated at step 410 may be transmitted through the central antenna 110-1 to a remote fronthaul module.

Though the steps of the method 400 may be depicted and described in a certain order, those skilled in the art will appreciate that the order in which the steps are performed may vary between different embodiments. Additionally, those skilled in the art will appreciate that the components described above with respect to the method 400 are merely examples of components that may be used with the method 400, and that other components may also be utilized in some embodiments. Furthermore, those skilled in the art will appreciate that at least some of the steps depicted and described with respect to the method 400 may be modified (e.g., order or components used) such that the method 400 may be performed by a fronthaul module at a remote location, such as the remote fronthaul 106-1, to transport data received by a radio receiver at the remote location to another fronthaul module at the edge of a backhaul network, such as the central fronthaul module 112, which may be located at a central office.

Figure 5:
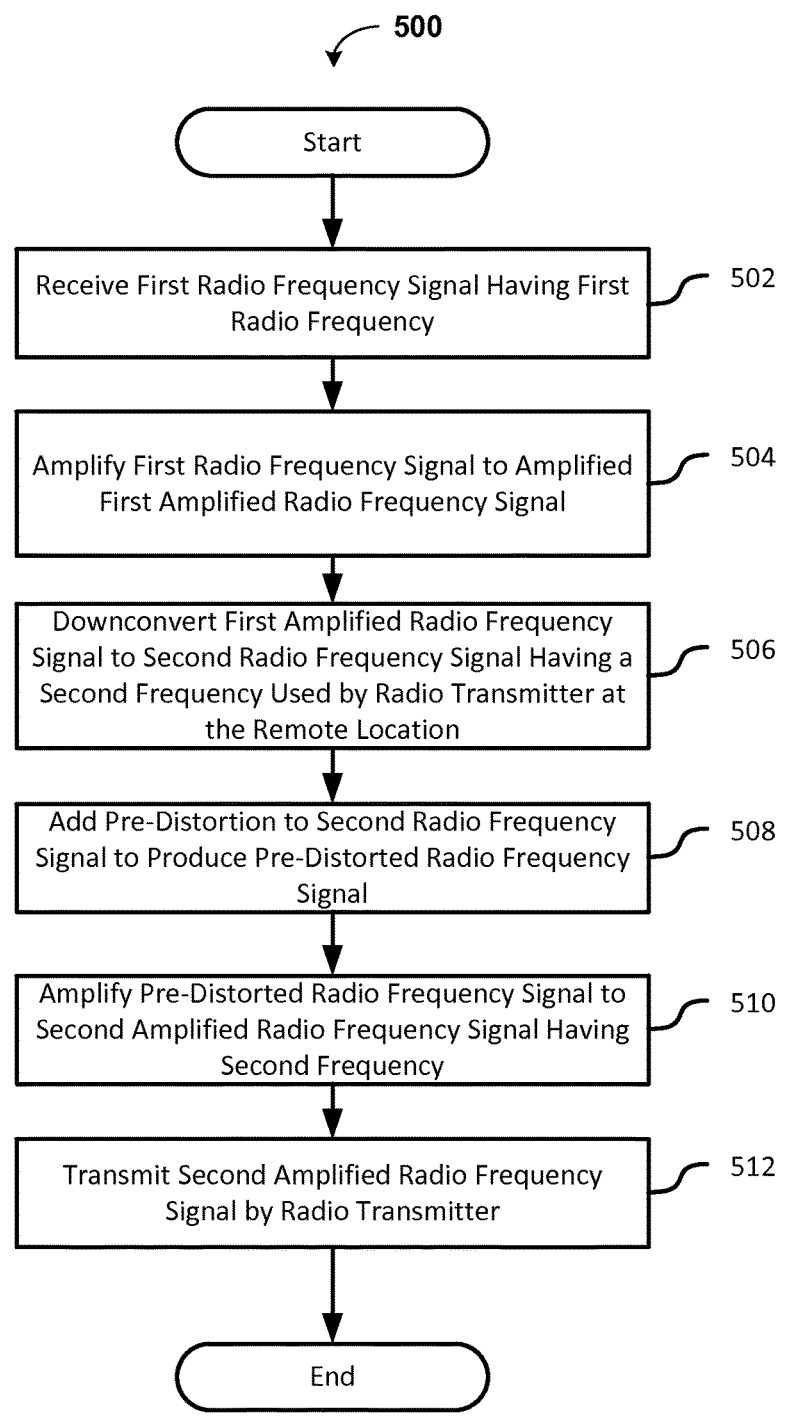
FIG. 5 is a flow diagram of an example method for a fronthaul system in accordance with some embodiments.

FIG. 5 is a flow diagram of an example method 500 for a fronthaul system in accordance with some embodiments. According to some embodiments, the method 500 is performed by a fronthaul module, such as the remote fronthaul module 106-1, coupled a radio receiver (e.g., RRH or the like) and configured to transport data from the radio receiver to another fronthaul module, such as the central fronthaul module 112, coupled to a radio process unit, such as a baseband unit or the like. As described herein, the remote fronthaul 106-1 may be implemented at a remote location where the radio receiver is be implemented, such as a cell site, while the central fronthaul module 112 may be implemented at the edge of a backhaul network, such as a central office (CO). As also described herein, by performing the method 500, the remote fronthaul module 106-1 may facilitate the extension of an interface, such as a CPRI interface, from a radio receiver to a radio processing unit remote (e.g., 1-10 km away) from the radio receiver.

As shown in FIG. 5, the method 500 may begin at step 502, with the first power amplifier 300 receiving a first radio frequency signal from the remote antenna 108-1. As described herein, the first radio frequency signal may be received from a central fronthaul module, which converted data from a baseband unit (e.g., the baseband unit 114) to the first radio frequency signal. At step 504, the first power amplified 300 may amplify the first radio frequency signal received at step 502 to produce a first amplified radio frequency signal. At step 506, the local oscillator module 302 may downconvert the first amplified radio frequency signal generated a step 504 to produce a second radio frequency signal having a second frequency. As described herein, the second frequency of the second radio frequency signal may be similar or equal to the operating frequency (e.g., target frequency) of the radio transceiver 104-1, which will eventually transmit the signal it receives from the remote fronthaul module 106-1.

At step 508, the pre-distortion module 304 may add pre-distortion to the second radio frequency generated at step 506 and produce a pre-distorted radio frequency signal. As described herein, the pre-distortion module 304 may add pre-distortion to the second radio frequency based on a control signal provided by the feedback control module 310, which in turn may generate the control signal based on a sample of the radio signal outputted by the second power amplifier 306 (as provided by the directional coupler 308).

At step 510, the second power amplifier 306 may amplify the pre-distorted radio frequency signal generated at step 508 to produce a second amplified radio frequency signal. Eventually, at step 512, the second amplified radio frequency signal generated at step 510 may be transmitted by the radio transceiver 104-1.

Though the steps of the method 500 may be depicted and described in a certain order, those skilled in the art will appreciate that the order in which the steps are performed may vary between different embodiments. Additionally, those skilled in the art will appreciate that the components described above with respect to the method 500 are merely examples of components that may be used with the method 500, and that other components may also be utilized in some embodiments. Furthermore, those skilled in the art will appreciate that at least some of the steps depicted and described with respect to the method 500 may be modified (e.g., order or components used) such that the method 500 may be performed by a fronthaul module at the edge of a backhaul network, such as the central fronthaul module 112 located at a central office, to transport data from the backhaul network to another fronthaul module, such as the remote fronthaul 106-1, coupled to a radio transmitter at a remote location.

Figure 6:
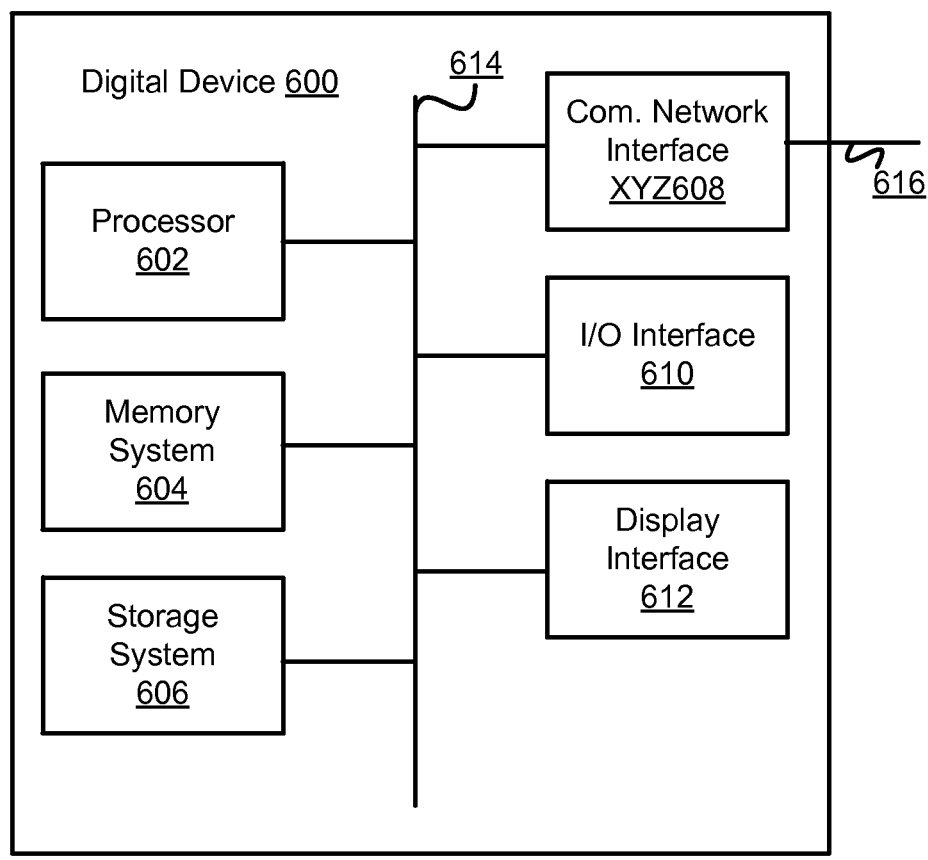
FIG. 6 depicts an example digital device according to some embodiments.

FIG. 6 depicts an example digital device 600 according to some embodiments. The digital device 600 comprises a processor 602, a memory system 604, a storage system 606, a communication network interface 608, an I/O interface 610, and a display interface 612 communicatively coupled to a bus 614. The processor 602 may be configured to execute executable instructions (e.g., programs). In some embodiments, the processor 602 comprises circuitry or any processor capable of processing the executable instructions.

The memory system 604 is any memory configured to store data. Some examples of the memory system 604 are storage devices, such as RAM or ROM. The memory system 604 may comprise the RAM cache. In various embodiments, data is stored within the memory system 604. The data within the memory system 604 may be cleared or ultimately transferred to the storage system 606.

The storage system 606 is any storage configured to retrieve and store data. Some examples of the storage system 606 are flash drives, hard drives, optical drives, and/or magnetic tape. In some embodiments, the digital device 600 includes a memory system 604 in the form of RAM and a storage system 606 in the form of flash data. Both the memory system 604 and the storage system 606 comprise computer readable media that may store instructions or programs that are executable by a computer processor including the processor 602.

The communication network interface (com. network interface) 608 may be coupled to a data network via the link 616. The communication network interface 608 may support communication over an Ethernet connection, a serial connection, a parallel connection, or an ATA connection, for example. The communication network interface 608 may also support wireless communication (e.g., 802.11a/b/g/n, WiMAX). It will be apparent to those skilled in the art that the communication network interface 608 may support many wired and wireless standards.

The optional input/output (I/O) interface 610 is any device that receives input from the user and output data. The optional display interface 612 is any device that may be configured to output graphics and data to a display. In one example, the display interface 612 is a graphics adapter.

It will be appreciated by those skilled in the art that the hardware elements of the digital device 600 are not limited to those depicted in FIG. 6. A digital device 600 may comprise more or less hardware elements than those depicted. Further, hardware elements may share functionality and still be within various embodiments described herein. In one example, encoding and/or decoding may be performed by the processor 602 and/or a co-processor located on a GPU.

One or more functions may be stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Various embodiments are described herein as examples. It will be apparent to those skilled in the art that various modifications may be made and other embodiments can be used.

I claim:

1. A method of transmitting data from a wired backhaul network to a wireless fronthaul network, for wireless transmission to mobile subscribers by a remote transceiver operating at a remote operating radio frequency, the method comprising:
receiving, at a central fronthaul module, a backhaul baseband signal comprising data from a baseband unit, the backhaul baseband signal being received over a wired Common Public Radio Interface (CPRI) interconnection coupling the central fronthaul module to the baseband unit;
converting the backhaul baseband signal to a first radio frequency signal having a first frequency, the first frequency being at or near the remote operating radio frequency of the remote transceiver for wireless transmission to the mobile subscribers;
pre-distorting, using an analog pre-distorter, a first intermediate signal to produce a pre-distorted radio frequency signal, the first intermediate signal being based on the first radio frequency signal and being at the first frequency, thereby enabling the pre-distorting to occur on the first intermediate signal at or near the remote operating radio frequency of the remote transceiver;

upconverting a second intermediate signal to a second radio frequency signal having a second frequency higher than the first frequency, the second intermediate signal being based on the pre-distorted radio frequency signal at the first frequency, the second frequency being a microwave or millimeter wave frequency;

amplifying a third intermediate signal to an amplified radio frequency signal having the second frequency, the third intermediate signal being based on the second radio frequency signal; and transmitting a fourth intermediate signal at the second frequency to the remote transceiver, the fourth intermediate signal being based on the amplified radio frequency signal.

2. The method of claim 1, wherein the data is received by the central fronthaul module over a fiber optic connection.

3. The method of claim 1, wherein the first frequency relates to cellular communications.

4. The method of claim 1, wherein the first frequency comprises a Long Term Evolution (LTE) frequency.

5. The method of claim 1, wherein the pre-distorting is based on a feedback signal, the feedback signal being based on the amplified radio frequency signal.

6. The method of claim 1, wherein the second frequency comprises a millimeter wave frequency.

7. A central fronthaul module comprising:
a conversion module configured to:
receive a backhaul baseband signal comprising data from a baseband unit, the backhaul baseband signal being received over a wired Common Public Radio Interface (CPRI) interconnection coupling the central fronthaul module to the baseband unit, and
convert the backhaul baseband signal to a first radio frequency signal having a first frequency, the first frequency being at or near a remote operating radio frequency of a remote transceiver for wireless transmission to mobile subscribers;

an analog pre-distortion module configured to pre-distort a first intermediate signal to produce a pre-distorted radio frequency signal, the first intermediate signal being based on the first radio frequency signal and being at the first frequency, thereby enabling the pre-distorting to occur on the first intermediate signal at or near the remote operating radio frequency of the remote transceiver;

an upconversion module configured to upconvert a second intermediate signal to a second radio frequency signal having a second frequency higher than the first frequency, the second intermediate signal being based on the pre-distorted radio frequency signal at the first frequency, the second frequency being a microwave or millimeter wave frequency;

a power amplifier configured to amplify a third intermediate signal to an amplified radio frequency signal having the second frequency, the third intermediate signal being based on the second radio frequency signal; and a transmission module configured to transmit a fourth intermediate signal at the second frequency to the remote transceiver by an antenna, the fourth intermediate signal being based on the amplified radio frequency signal.

8. The central fronthaul module of claim 7, wherein the data is received by the conversion module over a fiber optic connection.

9. The central fronthaul module of claim 7, wherein the first frequency relates to cellular communications.

10. The central fronthaul module of claim 7, wherein the first frequency comprises a Long Term Evolution (LTE) frequency.

11. The central fronthaul module of claim 7, wherein the pre-distorting is based on a feedback signal, the feedback signal being based on the amplified radio frequency signal.

12. The central fronthaul module of claim 7, wherein the second frequency comprises a millimeter wave frequency.

* * * * *